US012777298B2

(12) United States Patent
Scanlan

(10) Patent No.: US 12,777,298 B2
(45) Date of Patent: Oct. 27, 2026

(54) SYSTEMS AND METHODS FOR MITIGATING THE EFFECT OF WATER RETAINED IN A MICROPHONE PORT

(71) Applicant: Google LLC, Mountain View, CA (US)

(72) Inventor: James Mcgregor Scanlan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 112 days.

(21) Appl. No.: 18/726,106

(22) PCT Filed: Dec. 20, 2022

(86) PCT No.: PCT/US2022/053481
§ 371 (c)(1),
(2) Date: Jul. 1, 2024

(87) PCT Pub. No.: WO2023/129421
PCT Pub. Date: Jul. 6, 2023

(65) Prior Publication Data

US 2025/0063315 A1 Feb. 20, 2025

Related U.S. Application Data

(60) Provisional application No. 63/295,222, filed on Dec. 30, 2021.

(51) Int. Cl.
*H04R 29/00* (2006.01)
*G01N 27/22* (2006.01)
*H04R 3/04* (2006.01)

(52) U.S. Cl.
CPC ......... *H04R 29/004* (2013.01); *G01N 27/223* (2013.01); *H04R 3/04* (2013.01); *H04R 2499/11* (2013.01)

(58) Field of Classification Search
CPC .... H04R 29/004; H04R 3/04; H04R 2499/11; G01N 27/223
See application file for complete search history.

(56) References Cited

U.S. PATENT DOCUMENTS 9,980,026 B2 * 5/2018 Zadesky ................ H04R 3/007
10,209,123 B2 2/2019 Vitt et al.
(Continued)

FOREIGN PATENT DOCUMENTS

CN 113630708 A 11/2021
WO WO 2014/037766 A1 3/2014

OTHER PUBLICATIONS

International Search Report for PCT/US2022/053481, mailed on Apr. 4, 2023, 4 pages.
(Continued)

*Primary Examiner* — Daniel R Sellers
(74) *Attorney, Agent, or Firm* — DORITY & MANNING, P.A.

(57) ABSTRACT

Provided is a system for correcting the audio received by an audio sensor that has been distorted by the presence of water in a port associated with the audio sensor. More specifically, wearable computing devices can include audio sensors that can detect audio signals in the vicinity of the wearable computing devices. To enable the audio sensors to capture audio signal data more accurately, the wearable computing device can include a port (e.g., a microphone or "mic" port) that connects the audio sensor to the exterior of the wearable computing device. However, in some circumstances, the port can become partially or totally filled with water. For example, when a user is swimming while wearing the wearable computing device, the wearable computing device may be submerged and the port can become filled with water.

18 Claims, 6 Drawing Sheets

(56) References Cited

U.S. PATENT DOCUMENTS

| | | | | |
|---|---|---|---|---|
| 2016/0241945 | A1* | 8/2016 | Zadesky | H04R 29/00 |
| 2017/0006399 | A1 | 1/2017 | Maziewski | |
| 2018/0074693 | A1* | 3/2018 | Jones | H04M 1/18 |
| 2020/0037069 | A1 | 1/2020 | Park et al. | |
| 2020/0107113 | A1* | 4/2020 | Hou | G01L 15/00 |
| 2020/0378824 | A1 | 12/2020 | Mazur et al. | |
| 2021/0072176 | A1* | 3/2021 | Han | G01N 27/07 |
| 2021/0088981 | A1 | 3/2021 | Liang et al. | |
| 2021/0195311 | A1 | 6/2021 | Jiao | |

OTHER PUBLICATIONS

International Preliminary Report on Patentability for Application No. PCT/US2022/053481, mailed Jul. 11, 2024, 8 pages.

* cited by examiner

FIG. 5
500
502
506
INPUT DATA
WATER LIKELIHOOD MODEL
OUTPUT DATA

SYSTEMS AND METHODS FOR MITIGATING THE EFFECT OF WATER RETAINED IN A MICROPHONE PORT

PRIORITY CLAIM

This application is based upon and claims the right of priority under 35 U.S.C. § 371 to International Application No. PCT/US2022/053481 filed on Dec. 20, 2022, which claims priority to U.S. Provisional Application No. 63/295,222, filed on Dec. 30, 2021. Applicant claims priority to and the benefit of each of such applications and incorporate all such applications herein by reference in its entirety.

FIELD

The present disclosure relates generally to removing distortions from sensors in wearable computing systems. More particularly, the present disclosure is directed to systems and methods for mitigating the effect of water retained in a microphone port on the audio data captured by an audio sensor.

BACKGROUND

Advances in wearable technology such as fitness trackers and smartwatches have enabled these devices to be used in a variety of contexts. For example, fitness trackers and smartwatches can be used in contexts in which water may enter the port associated with a microphone or other audio sensor without damaging the device. However, if water partially or totally obstructs the port associated with an audio sensor, the audio data produced by that sensor can be distorted. This distortion can reduce the ability of the device to accurately analyze and respond to the detected audio.

SUMMARY

Aspects and advantages of embodiments of the present disclosure will be set forth in part in the following description, or may be learned from the description, or may be learned through practice of the embodiments. One example aspect of the present disclosure is a method directed to correcting distortion introduced to audio data caused by water in a port associated with an audio sensor. The method comprises accessing, by a wearable computing device including one or more processors, port status data. The method further comprises determining, by the wearable computing device and based on the port status data, a water presence likelihood value, the water presence likelihood value representing a likelihood that water is currently in the port. The method further comprises, in accordance with a determination that the water presence likelihood value exceeds a predetermined threshold, applying, by the wearable computing device, a digital correction filter to data produced by the audio sensor, wherein the digital correction filter corrects the data produced by the audio sensor to compensate for a presence of water in the port.

Another example aspect of the present disclosure is directed to a wearable computing device. The wearable computing device comprises one or more processors, an audio sensor, a port connecting the audio sensor to an exterior of a surface of the wearable computing device, and a non-transitory computer-readable memory: wherein the non-transitory computer-readable memory stores instructions that, when executed by the one or more processors, cause the wearable computing device to perform operations.

The operations comprise accessing port status data. The operations further comprise determining, based on the port status data, a water presence likelihood value, the water presence likelihood value representing a likelihood that water is currently in the port. The operations comprise, in accordance with a determination that the water presence likelihood value exceeds a predetermined threshold, applying a digital correction filter to data produced by the audio sensor, wherein the digital correction filter corrects the data produced by the audio sensor to compensate for a presence of water in the port.

Another example aspect of the present disclosure is directed to a non-transitory computer-readable medium storing instructions that, when executed by one or more computing devices, cause the one or more computing devices to perform operations. The operations comprise generating a water presence signal indicating a presence of water in the port. The operations further comprise, in response to the water presence signal, applying a digital correction filter to data produced by the audio sensor, wherein the digital correction filter corrects the data produced by the audio sensor to compensate for presence of water in the port.

Other example aspects of the present disclosure are directed to systems, apparatus, computer program products (such as tangible, non-transitory computer-readable media but also such as software which is downloadable over a communications network without necessarily being stored in non-transitory form), user interfaces, memory devices, and electronic devices for implementing and utilizing user computing devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1:
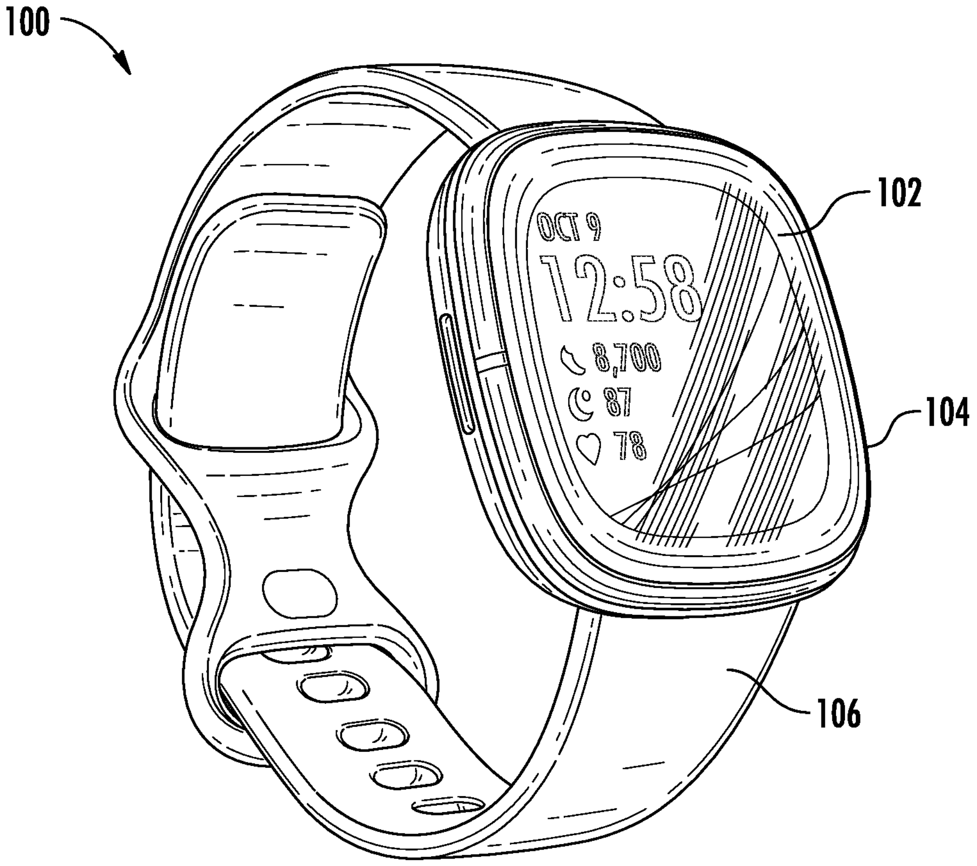
FIG. 1 illustrates an example wearable computing device in accordance with example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed towards a system for correcting the audio received by an audio sensor that has been distorted by the presence of water in a port associated with the audio sensor. More specifically, wearable computing devices can include audio sensors that can detect audio signals in the vicinity of the wearable computing devices. To enable the audio sensors to capture audio signal data more accurately, the wearable computing device can include a port (e.g., a microphone or "mic" port) that connects the audio sensor to the exterior of the wearable computing device. However, in some circumstances, the port can become partially or totally filled with water. For example, when a user is swimming while wearing the wearable computing device, the wearable computing device may be submerged and the port can become filled with water.

When water fills the port, the audio signal produced by the audio sensor can be distorted. To correct the distortions that result from water in the port, the wearable computing device can use one or more digital correction filters to remove or mitigate the distortions. However, to ensure that the digital correction filter is not used when no water is in the port, the wearable computing device can determine whether water is currently in the port or it is at least highly likely that water is in the port.

The wearable computing device can determine whether the port includes water based on one or more factors. The factors can include, but are not limited to, information gathered by sensors included in the wearable computing device, activity information logged by or automatically detected for the user, attempts by the user to clear water out of a speaker, the rate of evaporation around the wearable computing device, and/or detected distortions in data generated by the audio sensor.

These factors can be used to generate feature data. The feature data can include a plurality of features corresponding to the factors and can be used when determining whether there is water in the port. For example, a water determination system can use the feature data as input to an algorithm or machine-learned model. The algorithm or machine-learned model can be configured to generate a water likelihood score. The water likelihood score can represent the likelihood that there is water in the port based on the features. If the water likelihood score exceeds a threshold, the wearable computing device can apply a digital correction filter to data produced by the audio sensor to compensate for the presence of water in the port. In some examples, the parameters of the filter can be updated over time as the likelihood of water continuing to be in the port decreases or the amount of water in the port decreases. For example, the decrease in the likelihood of water continuing to be in the port can automatically decay over time according to a decay schedule or parameter or the likelihood of water continuing to be in the port can be reduced as the algorithm or machine-learned model evaluates new input feature data over time.

In one specific example, a user can log a swimming activity and then select the "clear water" functionality from their wearable computing device. The wearable computing device can determine that, based on the logged swimming activity and the user selection of the clear water functionality (which typically works to clear water from a speaker), the port is likely to have water in it. As a result, the wearable computing device can apply a digital correction filter to the audio data produced by the audio sensor based on the amount of time passed since the swimming activity was logged and the current evaporation rate associated with the area where the wearable computing device is located.

More specifically, a wearable computing device can include any computing device that is integrated into an object that is meant to be worn by a user. For example, wearable computing devices can include, but are not limited to, smartwatches, fitness bands, computing devices integrated into jewelry such as smart rings or smart necklaces, computing devices integrated into items of clothing such as jackets, shoes, and pants, and wearable glasses with computing elements included therein. In some examples, a wearable computing device can include one or more sensors intended to gather information with the permission of the user that is wearing the wearable computing device.

In some examples, the sensors can include an audio sensor such as one or more microphones. To capture the audio information around the wearable computing device as accurately as possible, the wearable computing device can have a port that connects the audio sensor (which is internal to the wearable computing device) with the exterior of the wearable computing device. This port can also be referred to as a mic port. The port can allow audio signals to reach the audio sensor more clearly. However, if the audio port becomes obstructed, the quality of the audio signals received can be degraded or the audio signals themselves can be altered.

In some examples, wearable computing devices can be made such that they can safely be brought in contact with water (e.g., waterproof devices or water-resistant devices). In this case, the presence of water will not damage the device but may alter the quality of the audio data gathered by the audio sensor if the water fills or at least partially obstructs the port. Thus, the wearable computing device can improve the quality of the audio data by mitigating the presence of water when it fills the port.

To effectively mitigate the presence of water, the wearable computing device can determine whether water is present in the port. Determining whether water is present in the port can be based on one or more signals accessed by the wearable computing device. For example, the wearable computing device can include additional sensors that function to determine whether water is present in the port. One such sensor can be a humidity sensor (or a water sensor or a moisture sensor). The humidity sensor can measure humidity in the area around the wearable computing device and, based in part on the humidity data, the wearable computing device can estimate whether water is present in the port. In some examples, the wearable computing device can include more than one port and the humidity sensor can have access to a different port that the audio sensor.

Another possible sensor can be one or more electrodes that can directly detect the presence of water in the port. For example, the electrodes may connect to a portion of the port and may react to the presence of water in such a way that an electrical signal is produced (e.g., the presence of water in the port may facilitate the increased transmission of an electrical signal between the electrodes). The electrical signal can be analyzed to determine, along with other data, that water is present in the port.

In addition to sensor data, the wearable computing device can access data supplied by the user. For example, the wearable computing device can have an application that allows the user to log activities that the user performs. In other examples, algorithms or machine-learned models can be used to automatically detect activities that the user performs based on various device data such as sensor data (e.g., data from accelerometers or the like). Based on the logged or detected activity, the wearable computing device can determine whether the port is likely to have water in it. For example, the wearable computing device can determine a higher likelihood of water in the port if the user logs a swimming activity in the recent past. This activity log can be combined with motion detection in the wearable computing device itself to determine whether the wearable computing device was being worn by the user while the swimming activity was being performed.

In some examples, a wearable computing device can include functionality intended to help clear water from a speaker included in the wearable computing device. For example, a wearable computing device, such as a smart-watch or fitness band, can include a "clear water" functionality that provides a low signal to the speaker and causes the speaker to vibrate or otherwise mechanically remove water from the speaker. The user can select this functionality when the user determines that water is in the speaker of the microphone. For example, the user may notice that the speaker is producing low-quality audio that is being muffled or otherwise altered by water in or near the speaker. The wearable computing device can determine that if the user has selected this functionality the likelihood of water also being in the microphone port is relatively high.

In some examples, the wearable computing device can use weather data accessible over a network and location data for the user (e.g., based on a GPS signal for their wearable computing device) to determine whether the user was in a location in which rain may have been encountered. For example, if the forecast for a specific region indicates heavy rain and the location data for the user indicates that the user was in that region, the wearable computing device can determine a higher likelihood of water in the port.

In some examples, the wearable computing device can also analyze the audio signals produced by the audio sensor to determine whether the audio signals appear to be distorted in a manner associated with water in the port. For example, the wearable computing device can include or have access to data representing types of distortions that are characteristically caused by the presence of water. This data or other data representing how audio signals can be distorted by the presence of water can be used to analyze the data generated by the audio sensor to determine whether the data includes evidence of distortion by water in the port.

For example, the wearable computing device can capture audio data from background noise and analyze it for evidence of water-based distortions. Specific indications of water-based distortions can include, but are not limited to, the background noise being very quiet (e.g., in comparison to previously captured background noise), low volume at high frequencies, the background sound having a muffled quality, and so on. In some examples, to accurately analyze the captured background sound for distortion, the wearable computing device can gather sound data over time for a long-term average. In some examples, different long-term averages (or baselines) can be captured for different locations that the user frequents which may have different acoustic properties.

In some examples, the wearable computing device can use its speaker to play a known sound at a known volume (e.g., a test sound). The wearable computing device can then analyze the audio data produced by the audio sensor for that sound. This can allow the wearable computing device to detect distortions in the audio data more easily.

Similarly, while performing two-way communication (e.g., one user is speaking with another user), the wearable computing device can use an echo-canceller to prevent a user's own voice from being played from their own speaker. The transfer function generated as part of the echo canceller can be compared to the data captured by the audio sensor and any distortions can be detected.

In some examples, the data can be device-specific such that the specific size and dimension of the port can affect the likelihood that data distortions are from water in the port. For example, different port designs can result in different shapes of water droplets obstructing the port. In some examples, different shapes of water droplets can have different characteristic frequencies when distorting the audio data. Thus, if the shape of a particular port in a wearable computing device is known, the data can be analyzed to identify one or more characteristic frequencies.

In some examples, a machine-learned classification model can be used to determine whether the audio signal generated by the audio sensor exhibits distortion (and potentially also what type of distortion) caused by the presence of water in the mic port. For example, the machine-learned classification model can have been trained on training data that includes audio samples that have been labeled with ground truth information that indicates whether the audio samples correspond to or exhibit distortion (and potentially also what type of distortion) caused by the presence of water in the port.

In some examples, the wearable computing device can generate a plurality of features from the above data, each feature representing a particular type of data that may be indicative of the presence of water in the port. In some examples, the features generated can be used as input to an algorithm or machine learning model that generates a water likelihood score. The water likelihood score can represent the likelihood that water is currently in the port. In some examples, the water likelihood score can be compared to a threshold value. If the water likelihood score exceeds the threshold, the wearable computing device can determine that the port includes water.

In response to determining that the port includes water, the wearable computing device can use a digital correction filter. In some examples, the digital correction filter can be associated with a particular model of wearable computing device such that each wearable computing device has a filter that will remove the specific types of audio distortions introduced by the water in the port for that particular wearable computing device. Additionally, or alternatively, the digital correction filter that is selected for application can be dependent upon the type or amount of water included in the port.

In some examples, the parameters of the digital correction filter can be altered over time such that the correction characteristics of the filter are updated as the likelihood of continued water presence in the port reduces or the amount of water in the port reduces (e.g., as water evaporates or leaks out of the port). In this way, the digital correction filter may be variable over time. For example, the use of the digital correction filter can be reduced linearly or non-linearly.

The systems and methods of the present disclosure provide a number of technical effects and benefits. As one example, the proposed systems can provide for modified or corrected audio signals that account for and counteract distortions caused by the presence of water in the mic port. Thus, the systems and methods of the present disclosure can provide for improved audio performance (e.g., audio collection performance) by a wearable computing device. This represents an improvement in the functioning of the device itself.

With reference now to the figures, example aspects of the present disclosure will be discussed in greater detail.

FIG. 1 depicts the front view of an example wearable computing device 100 according to example embodiments of the present disclosure. In one embodiment, the wearable computing device 100 may be a wristband, a bracelet, a wristwatch, an armband, a ring placed around a digit of the user, or other wearable products that may be equipped with sensors as described in the present disclosure. In an example embodiment, the wearable computing device 100 is configured with a display 102, a device housing 104, a band 106, and one or more sensors. In an embodiment, the display 102 can be configured to present to a user data relating to the user's skin temperature, heart rate, sleep state, electroencephalogram, electrocardiogram, electromyography, electrooculogram, and other physiological data of the user (e.g., blood oxygen level). The display 102 can also be configured to convey data from additional ambient sensors contained within the wearable computing device 100. Example information conveyed on the display 102 from these additional ambient sensors can include the positioning, altitude, and weather of a location associated with the user. The display 102 can also convey data regarding the motion of the user (e.g., whether the user is stationary, walking, and/or running).

In an example embodiment, the display 102 can be configured to receive data input by the user. In an embodiment, a user can, by input on the display, request that the wearable computing device 100 generate additional data for display to the user. In response, the display 102 can present instructions to the user to obtain the data. In some examples, the wearable computing device 100 can display instructions to the user (e.g., display "please hold your finger against a sensor for 10 seconds").

In an example embodiment, the device housing 104 can be configured to contain one or more sensors described in the present disclosure. Example sensors contained by the device housing 104 can include audio sensors, motion sensors (e.g., accelerometer), a pulse oximeter, an IR motion sensor, skin temperature sensors, internal device temperature sensors, location sensors (e.g., GPS), altitude sensors, heart rate sensors, pressure sensors, gyroscopes, environmental sensors (e.g., bedside ultrasounds sensors), and other physiological sensors (e.g., blood oxygen level sensors). In an embodiment, the device housing 104 can also be configured to include one or more processors. The device housing 104 can include a port that connects an audio sensor to the outside of the device housing 104, thus allowing audio information to reach the audio sensor without needing to pass through the device housing 104.

The band 106 can be configured to secure the wearable computing device 100 around an arm of the user by, for example, connecting ends of the band 106 with a buckle, clasp, or another similar securing device, thereby allowing the wearable computing device 100 to be worn by the user.

Figure 2:
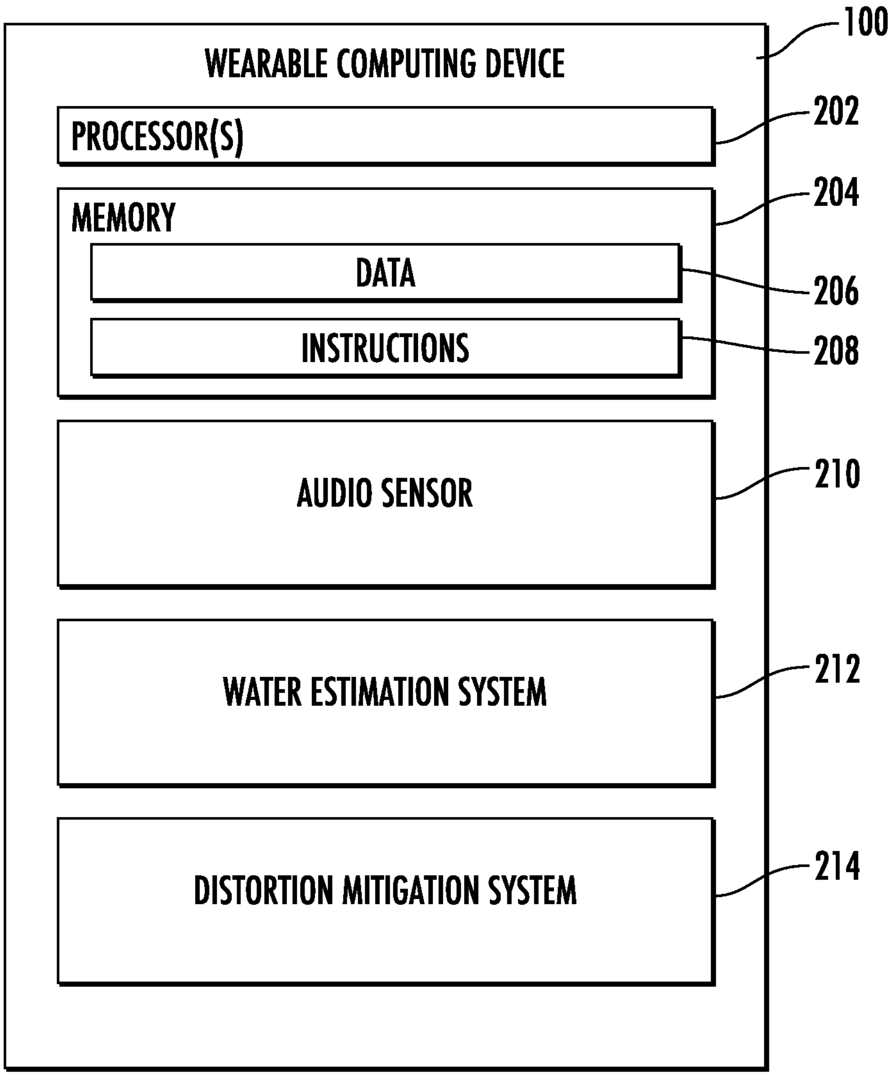
FIG. 2 illustrates a block diagram of an example computing environment that includes a wearable computing device having a sensor in accordance with example embodiments of the present disclosure.

FIG. 2 illustrates an example computing environment including a wearable computing device 100 in accordance with example embodiments of the present disclosure. In this example, the wearable computing device 100 can include one or more processors 202, memory 204, an audio sensor 210, a water determination system 212, and a distortion mitigation system 214.

In more detail, the one or more processors 202 can be any suitable processing device that can be embedded in the form factor of a wearable computing device 100. For example, such a processor 202 can include one or more of: one or more processor cores, a microprocessor, an application-specific integrated circuit (ASIC), an FPGA, a controller, a microcontroller, etc. The one or more processors 202 can be one processor or a plurality of processors that are operatively connected. The memory 204 can include one or more non-transitory computer-readable storage mediums, such as RAM, ROM, EEPROM, EPROM, flash memory devices, etc., and combinations thereof.

In particular, in some devices, memory 204 can store instructions for implementing the water determination system 212 and the distortion mitigation system 214. Thus, the wearable computing device 100 can implement a water determination system 212 and the distortion mitigation system 214 to execute aspects of the present disclosure.

It will be appreciated that the term "system" can refer to specialized hardware, computer logic that executes on a more general processor, or some combination thereof. Thus, a system can be implemented in hardware, application specific circuits, firmware, and/or software controlling a general-purpose processor. In one embodiment, the system can be implemented as program code files stored on the storage device, loaded into memory, and executed by a processor or can be provided from computer program products, such as computer-executable instructions, that are stored in a tangible computer-readable storage medium such as RAM, hard disk or optical or magnetic media.

Memory 204 can also include data 206 and instructions 208 that can be retrieved, manipulated, created, or stored by the one or more processor(s) 202. In some example embodiments, such data can be accessed and used as input to the water determination system 212 and/or the distortion mitigation system 214. In some examples, the memory 204 can include data used to perform one or more processes and instructions that describe how those processes can be performed.

In some examples, the wearable computing device 100 can include one or more sensors. For example, the sensors can include, but are not limited to, one or more of: an audio sensor 210, motions sensors (e.g., accelerometers), a pulse oximeter, an IR motion sensor, skin temperature sensors, internal device temperature sensors, location sensors (e.g., GPS), altitude sensors, heart rate sensors, audio sensors, pressure sensors, humidity sensors, and other physiological sensors (e.g., blood oxygen level sensors).

In some examples, the audio sensor 210 can detect audio signals in the environment around the wearable computing device 100. For example, the audio sensor 210 can be configured to capture audio signals associated with spoken language in the vicinity of the wearable computing device 100. In this way, a user can speak commands and the audio sensor 210 can capture data representing the commands. The audio sensor 210 can produce the captured data as audio data. The wearable computing device 100 can process the audio data to identify specific words or phrases and execute one or more commands based on the identified words or phrases.

The audio sensor 210 can be connected to a port (also referred to as a microphone port or "mic port"). The port is an open-air channel that connects the audio sensor to the exterior of the wearable computing device 100 such that audio signals can more easily be detected by the audio sensor 210 which is located in the interior of the casing of the wearable computing device 100. Without such a port, the audio signals would only be detected after they had passed through the casing of the wearable computing device 100.

The port can become partially or totally obstructed by water. For example, if the user wears a fitness band while swimming, the microphone port of the fitness band can become filled with water. Once the user gets out of the water, the water may not all drain out of the port immediately. The presence of water in the port can distort the audio signals such that the audio signals recorded by the audio sensor 210 do not accurately reflect the original sounds in the environment of the wearable computing device 100. This distortion can lower the accuracy of the wearable computing device 100 when processing the audio signal data produced by the audio sensor in order to identify key words or phrases that a user may speak to execute commands via the wearable computing device 100.

In order to compensate for the possible distorting effects of water in the port, the wearable computing device 100 can use the water determination system 212 to determine whether the port is currently partially or totally obstructed by water. Determining whether water is present in the port can be based on one or more signals accessed by the wearable computing device 100. For example, the wearable computing device 100 can include additional sensors that function to determine whether water is present in the port. One such sensor can be a humidity sensor. The humidity sensor can measure humidity in the area around the wearable computing device 100 (or in the port) and, based in part on the humidity data, the wearable computing device 100 can estimate whether water is present in the port.

Another sensor that can be included in the wearable computing device 100 is one or more electrodes that can directly detect the presence of water in the port. For example, the electrodes may connect to a portion of the port and may react to the presence of water in such a way that an electrical signal is produced (e.g., the presence of water in the port may facilitate increased conductivity between the electrodes). The electrical signal can be analyzed to determine that water is present in the port based on the measured conductivity. In some examples, if the conductivity between two electrodes exceeds a particular value, the wearable computing device 100 can determine that the port includes water. In some examples, the strength of the signal can be measured and a signal strength above a specific threshold can be determined to be evidence of water in the port.

In addition to data produced by one or more sensors, the wearable computing device 100 can access data supplied by the user. For example, the wearable computing device 100 can include or provide access to an activity tracking application that allows the user to log activities that the user performs. In other examples, algorithms or machine-learned models can be used to automatically detect activities that the user performs based on various device data such as sensor data (e.g., data from accelerometers or the like). Based on the logged or detected activity, the wearable computing device 100 can determine whether the port is likely to have water in it. For example, a user logging a water-based activity such as swimming, canoeing, rafting, and so on, in the recent past can cause the wearable computing device 100 to determine a higher likelihood of water in the port. This logged activity can be used in combination with motion detection in the wearable computing device 100 itself to determine whether the wearable computing device 100 was being worn by the user while the water-based activity was being performed.

In some examples, a wearable computing device 100 can include functionality intended to help clear water from one or more speakers included in the wearable computing devices. For example, a wearable computing device 100 such as a smartwatch or fitness band can include a "clear water" functionality that results in the wearable computing device beginning a process that attempts to clear water out of the speaker. A user can select this functionality when the user wants to clear water out of the speaker. In some examples, the clear water functionality can be enabled by instructing the speaker to play a known signal which causes the speaker to vibrate or shake in an attempt to, through physical agitation, dislodge water from the speaker. The wearable computing device 100 can determine whether this functionality has been activated by the user and, if so, determine that the likelihood of water also being in the port is relatively high. In addition, a user can put their wearable computing device in a water mode (e.g., by locking the touch screen). The user affirmatively placing their device in a mode associated with exposure to water can be a strong signal that water may be in the port.

In some examples, the wearable computing device 100 can use weather data accessible over a network and location data for the user (e.g., based on a GPS signal for their wearable computing device) to determine whether the user was in a location in which rain may have been encountered. For example, if the forecast for a specific region indicates heavy rain and the location data for the user indicates that the user was in that region, the wearable computing device can determine a higher likelihood of water in the port In some examples, the wearable computing device 100 can also analyze the audio signals produced by the audio sensor to determine whether the audio signals appear to be distorted in a manner associated with water in the port. For example, the wearable computing device 100 can include or have access to data representing types of distortions that are common when water is present. This data or other data representing how audio signals can be distorted by the presence of water can be used to analyze the data generated by the audio sensor to determine whether the data includes evidence of distortion by water in the port. For example, the wearable computing device can capture audio data from background noise and analyze it for evidence of water-based distortions. Specific indications of water-based distortions can include, but are not limited to, the background noise being very quiet (e.g., in comparison to previously captured background noise), low volume at high frequencies, the background sound having a muffled quality, and so on. In some examples, the distortive effect of water on the audio data captured can be similar to a low pass filter.

In some examples, the data can be device-specific such that the specific size and dimension of the port can affect the likelihood that data distortions are from water in the port. In some examples, a machine-learned classification model can be used to determine whether the audio signal generated by the audio sensor exhibits distortion (and potentially also what type of distortion) caused by the presence of water in the mic port. For example, the machine-learned classification model can have been trained on training data that includes audio samples that have been labeled with ground truth information that indicates whether the audio samples correspond to or exhibit distortion (and potentially also what type of distortion) caused by the presence of water in the mic port.

In some examples, wearable computing device 100 can access data representing the current evaporation rate for water in the port based on a plurality of possible factors including the temperature, humidity, the shape of the port, and so on. The evaporation rate can be used, in coordination with other data to determine whether the water in the port has evaporated. The temperature can be determined based on a sensor or retrieved via a computer network.

In some examples, the wearable computing device 100 can generate a plurality of features from the above data, each feature representing a particular type of data that may be indicative of the presence of water in the port. In some examples, the features generated can be used as input to an algorithm or machine learning model that generates a water likelihood score. The water likelihood score can represent the likelihood that water is currently in the port. In some examples, the water likelihood score can be compared to a threshold value. If the water likelihood score exceeds the threshold, the wearable computing device 100 can determine that the port includes water.

If the wearable computing device 100 determines that the port includes water, it can use the distortion mitigation system 214 to mitigate the distortive effects of water in the port. In some examples, the distortion mitigation system 214 can employ a digital correction filter to modify the data output by the audio sensor 210. In some examples, the digital correction filter can be associated with a particular model of wearable computing device 100 such that each particular wearable computing device has a filter that will remove the specific types of audio distortions introduced by the water in the port for that particular wearable computing device 100. Additionally, or alternatively, the digital correction filter that is selected can be dependent upon the type or amount of water included in the port.

In some examples, the parameters of the digital correction filter can be altered over time such that the correction characteristics of the filter are updated as the likelihood of continued water presence in the port reduces or the amount of water in the port reduces (e.g., as water evaporates or leaks out of the port). In this way, the digital correction filter may be variable over time.

Once the digital correction filter has been activated, the wearable computing device 100 can present the current port status information to the user. For example, the wearable computing device 100 can display an icon representing that water is currently in the port. Similarly, the wearable computing device 100 can display information describing possible further actions the user can take to mitigate the presence of water in the port.

Figure 3:
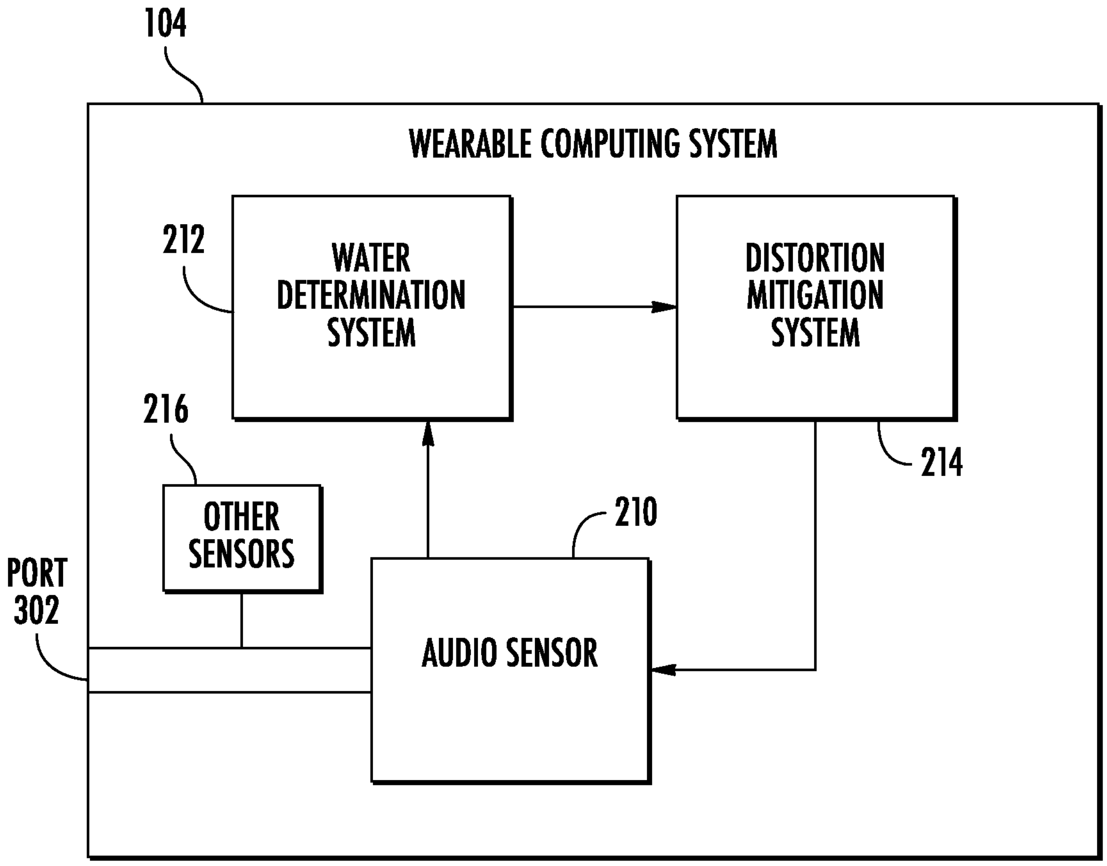
FIG. 3 depicts an example wearable computing system according to example embodiments of the present disclosure.

FIG. 3 depicts an example wearable computing system according to example embodiments of the present disclosure. The wearable computing device 100 includes, among other components (not pictured), a water determination system 212, a distortion mitigation system 214, an audio sensor 210, and a port 302.

The audio sensor 210 can be a microphone enabled to detect audio signals in the environment and generate audio data based on those signals. Port 302 connects the audio signal to the exterior of the wearable computing device 100. As noted above, the port 302 is an open-air channel that allows audio signals to be directly detected by the audio sensor 210.

A water determination system 212 can use information from a plurality of signals (including an analysis of the data produced by the audio sensor 210) to determine whether the port 302 has water partially or completely obstructing it.

If the water determination system 212 determines that there is likely water in the port 302, the distortion mitigation system 214 can apply a digital correction filter to modify the data output by the audio sensor 210. The digital correction filter can be associated with a particular model of wearable computing device 100 such that each particular wearable computing device has a filter that will remove the specific types of audio distortions introduced by the water in the port for that particular wearable computing device 100. Additionally, or alternatively, the digital correction filter that is selected can be dependent upon the type or amount of water included in the port. The digital correction filter can alter the signal produced by the audio sensor 210 such that the distortion introduced by the water in the port is removed or minimized.

In some examples, the distortion mitigation system 214 can adjust the parameters of the digital correction filter over time. In some examples, the adjustments can be based on an evaporation rate associated with the current environment of the wearable computing device 100. In other examples, the water determination system 212 can provide updated information that indicates the amount of water still in the port 302 and the digital correction filter can be adjusted based on the updated information.

Figure 4:
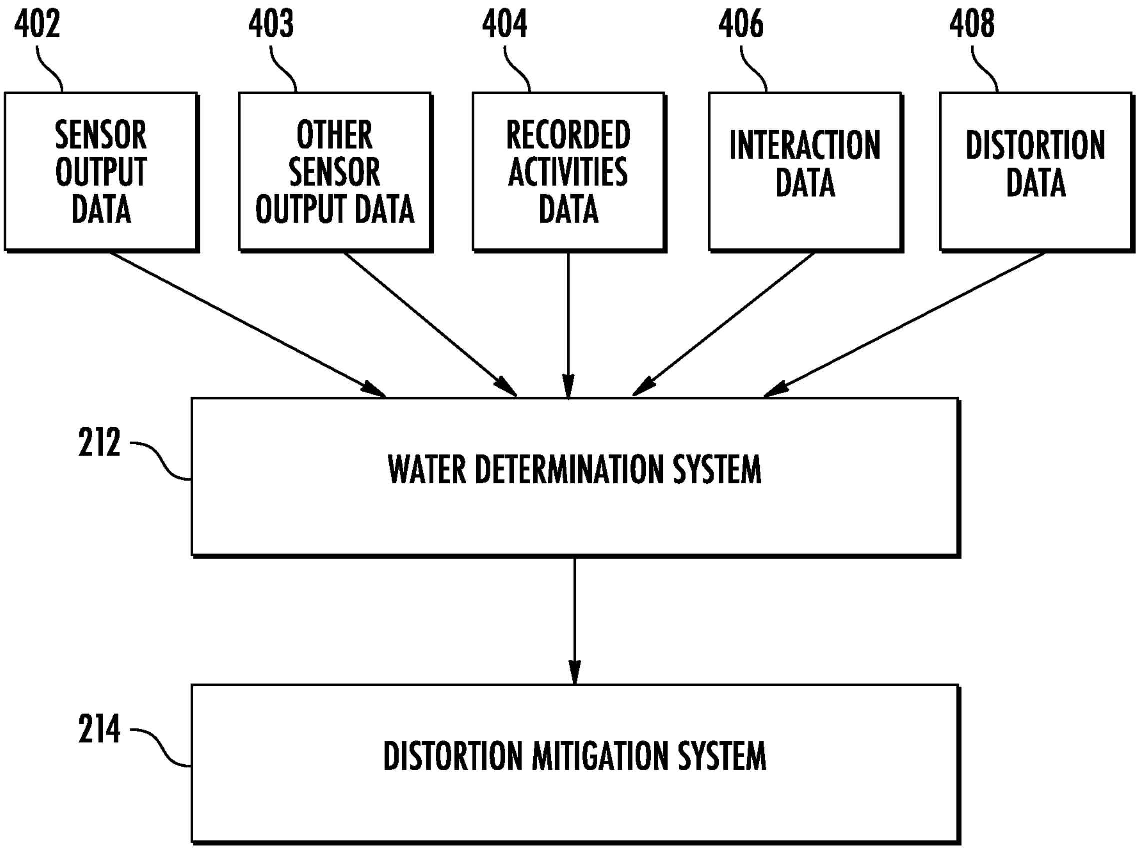
FIG. 4 is a block diagram illustrating an example system for mitigating audio distortion in a wearable computing device in accordance with example embodiments of the present disclosure.

FIG. 4 is a block diagram illustrating an example system for mitigating audio distortion in a wearable computing device in accordance with example embodiments of the present disclosure. A priority of sources of data can provide signals that can be used to determine whether water is in the port of a particular wearable computing device 100. For example, sensor output data 402 can be gathered as a first signal. Sensor output data 402 can be the output of a humidity sensor, a water detecting sensor (e.g., using electrodes), the audio sensor 210 itself, or any other sensor that may be useful in determining whether water is in the port. For example, the sensor output data 402 can include humidity sensor data. The humidity sensor data can represent the degree of humidity around the wearable computing device 100. In some examples, the humidity sensor data can represent a specific location like the inside of the port.

Sensor output data 402 can include data generated by electrodes. As noted above, water can increase the conductivity between two electrodes. Thus, the wearable computing device 100 can determine that water is present in the port based on the measured conductivity. In some examples, if the conductivity between two electrodes exceeds a particular value, the wearable computing device 100 can determine that the port includes water. In some examples, the strength of the signal can be measured and a signal strength above a specific threshold can be determined to be evidence of water in the port.

Another source of information can be activity data 404 based on activities recorded by the user. Activities can include any activity that may involve water. In some examples, the activity logging application can be used by a user to directly input a log of their activities. Alternatively, the wearable computing device can directly track activities (e.g., using a motion sensor) and log them automatically. Activities in which water is more likely to be present such as swimming, canoeing, kayaking, diving, rafting, scuba diving, snorkeling, or any water-based activity can increase the likelihood that water is in the port. In some examples, the length of time between the activity and the current time can be used to generate an estimation of the likelihood that water is still in the port. For example, water can leak or evaporate from the port over time. As a result, the longer the time between the logged activity and the current time, the less likely it is that water still remains in the port. The amount that the likelihood decreases can be affected by the evaporation rate in the area of the wearable computing device 100.

Another source of data can be interaction data 406 between the user and the wearable computing device 100. For example, a user can take one or more actions to remove water from the port. For example, the user can shake or otherwise jostle the device directly. In another example, the wearable computing device can have a water removal mechanism that can function to attempt to remove water from a speaker. Such a mechanism can include causing the speaker to vibrate or shake in an attempt to expel water from the speaker. Any attempt by the user to remove water in the speaker can be recorded by the wearable computing device and used as a signal to determine that water may also be in the port.

Another source of data can be the distortion detectable in the audio data 408 produced by the audio sensor to determine whether the audio signals appear to be distorted in a manner associated with water in the port. For example, the wearable computing device 100 can analyze audio data from the audio sensor 210. The wearable computing device 100 can include or have access to data representing types of distortions that are common when water is present. In some examples, the data can be device-specific such that the specific size and dimension of the port can affect the likelihood that data distortions are from water in the port.

In some examples, a machine-learned classification model can be used to determine whether the audio signal generated by the audio sensor exhibits distortion (and potentially also what type of distortion) caused by the presence of water in the mic port. For example, the machine-learned classification model can have been trained on training data that includes audio samples that have been labeled with ground truth information that indicates whether the audio samples correspond to or exhibit distortion (and potentially also what type of distortion) caused by the presence of water in the mic port. The machine-learned classification model can, once trained, take raw audio data as input and output a determination representing the likelihood that the raw audio signal has been distorted by water in the port. Alternatively, or additionally, the output of the machine-learned classification model can be specific parameters for a digital correction filter that can remove the distortion from the audio data 408.

In some examples, the wearable computing device 100 can use the above data to generate a plurality of features from the above data, each feature representing a particular type of data that may be indicative of the presence of water in the port. In some examples, the feature data can be normalized to a value between 0 and 1. In some examples, the feature data can be weighted based on a determination of which features are more or less important relative to the other features.

In some examples, the feature data can be used as input to the water determination system 212 to generate a water likelihood score. The water likelihood score can represent the likelihood that water is currently in the port. In some examples, the water likelihood score can be compared to a threshold value. If the water likelihood score exceeds the threshold, the wearable computing device can determine that the port includes water. In some examples, the water determination system 212 can include or access an algorithm or machine-learned model that can be used to generate a water likelihood score.

Once the water likelihood score has been generated (and potentially compared to a threshold), the water determination system 212 can determine whether the port includes water and pass that determination to the distortion mitigation system 214. In response to determining that the port includes water, the distortion mitigation system 214 can initiate the use of a digital correction filter. The digital correction filter can be a filter that takes the output of the audio sensor 210 and processes based on the specific characteristics or parameters of the digital correction filter. In some examples, the digital correction filter can be associated with a particular model of wearable computing device 100 such that each particular wearable computing device has a filter that will remove the specific types of audio distortions introduced by the water in the port for that particular wearable computing device. Additionally, or alternatively, the digital correction filter that is selected for application can be dependent upon the type or amount of water included in the port. Once the digital correction filter has been initiated, the distortion mitigation system 214 can periodically review whether the digital correction filter is still necessary. The water determination system 212 can periodically update the determination associated with the presence of water in the port.

Figure 5:
FIG. 5 depicts a block diagram of an example water likelihood model according to example embodiments of the present disclosure.

FIG. 5 depicts a block diagram of an example water likelihood model 500 according to example embodiments of the present disclosure. In this example, the water likelihood model can take feature data based on one or more sources of data associated with water in the port as input. In some examples, the input data 502 can be gathered by sensors, submitted by the user, accessed via a network, and/or based on analysis of captured audio data. The water likelihood model 500 can output data 506 including a water likelihood score.

In some examples, the water likelihood model 500 can generate or access feature data based on the input data 502. In some examples, the feature data can represent data gathered by sensors, data submitted by the user, data accessed via a network, and/or data generated based on analysis of captured audio data and/or correlations between the different data types or sources.

Once the feature data has been generated, the water likelihood model 500 can generate a water likelihood score, representing the likelihood that the port includes water. In some examples, the output data 506 can include a determination indicating whether the port includes water and a confidence value representing the degree to which the water likelihood model 500 is confident that the port includes water. In some examples, the determination and the confidence value can be generated based on the water likelihood value. For example, the output data may have a 70% confidence value associated with a determination that water is present in the port.

The output data 506 can be received from the water likelihood model 500 and transmitted to the distortion mitigation system 214. In some examples, the output data can be transmitted to the wearable computing device 100 for display to a user (e.g., indicating that water is present in the port).

Figure 6:
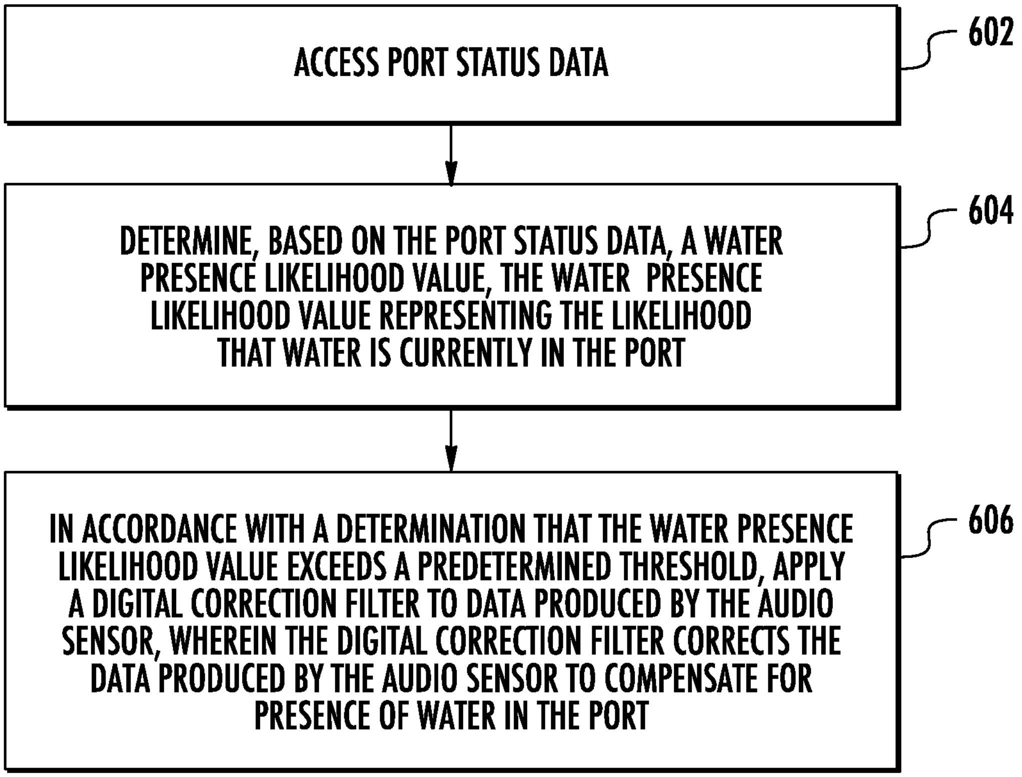
FIG. 6 is a flowchart depicting an example process of mitigating distortion in a signal produced by an audio sensor in accordance with example embodiments of the present disclosure.

FIG. 6 is a flowchart depicting an example process of mitigating distortion in a signal produced by an audio sensor in accordance with example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-3.

A wearable computing device (e.g., wearable computing device 100 in FIG. 1) can be configured to mitigate distortion in a signal produced by an audio sensor. The wearable computing device 100 can include one or more processors, an audio sensor: and a port connecting the audio sensor to an exterior of a surface of the wearable computing device 100. The wearable computing device can further include a non-transitory computer-readable memory: wherein the non-transitory computer-readable memory stores instructions that, when executed by the one or more processors, cause the wearable computing device to perform operations. In some examples, the audio sensor is a microphone.

The operations can include, at 602, accessing port status data. In some examples, the port status data includes application data supplied by a user. The application data supplied by a user can include recent activity data logged by the user. For example, the recent activity data logged by the user can include one or more water-based activities such as swimming, diving, scuba diving, boating, and so on.

In some examples the port status data can include data describing user interactions with the wearable computing device. For example, the user interactions with the wearable computing device include the user selecting a clear water function to clear water from a speaker included in the wearable computing device. The user interactions with the wearable computing device 100 can further include the user physically shaking or otherwise trying to manually dislodge water from the port. Data describing the user shaking the wearable computing device 100 can be gathered from a motion sensor (e.g., an accelerometer or gyroscope).

In some examples, the wearable computing device 100 includes a humidity sensor and wherein the port status data includes humidity data produced by the humidity sensor. In some examples, the wearable computing device includes electrodes in the port and the port status data includes data produced by the electrodes indicating whether water is sensed in the port. In some examples, the housing of the wearable computing device can be made of a non-metal material (e.g., plastic and so on) so that the conductivity between two electrodes is not compromised.

In some examples, the port status data can be generated by analyzing audio data produced by the audio sensor to identify audio distortions associated with water in the port. The port status data can include a current evaporation rate for water.

The wearable computing device 100 can determine, at 604, based on the port status data, a water presence likelihood value, the water presence likelihood value representing a likelihood that water is currently in the port. In accordance with a determination that the water presence likelihood value exceeds a threshold, the wearable computing device 100 can apply, at 606, a digital correction filter to data produced by the audio sensor, wherein the digital correction filter corrects the data produced by the audio sensor to compensate for the presence of water in the port. In some examples, the threshold can be predetermined for each specific wearable computing device. In other examples, the threshold can be adaptive determined, such that the threshold can be determined based, at least in part, on current conditions and data gathered by the wearable computing device based on past situations in which the threshold was exceeded. The digital correction filter can be a fixed compensating filter. In some examples, the digital correction filter can be an adaptive compensating filter. The digital correction filter can be updated over time based on a current evaporation rate for water.

The technology discussed herein refers to sensors and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed is:

1. A wearable computing device, the wearable computing device comprising:
- one or more processors,
- an audio sensor;
- a port connecting the audio sensor to an exterior of a surface of the wearable computing device;
- a non-transitory computer-readable memory; wherein the non-transitory computer-readable memory stores instructions that, when executed by the one or more processors, cause the wearable computing device to perform operations, the operations comprising:
  - accessing port status data, wherein the port status data includes a current evaporation rate for water;
  - determining, based on the port status data, a water presence likelihood value, the water presence likelihood value representing a likelihood that water is currently in the port; and
  - in accordance with a determination that the water presence likelihood value exceeds a threshold, applying a digital correction filter to data produced by the audio sensor, wherein the digital correction filter corrects the data produced by the audio sensor to compensate for a presence of water in the port.

2. The wearable computing device of claim 1, wherein the port status data includes application data supplied by a user.

3. The wearable computing device of claim 2, wherein the application data supplied by a user includes recent activity data logged by the user.

4. The wearable computing device of claim 1, wherein the port status data includes data describing user interactions with the wearable computing device.

5. The wearable computing device of claim 4, wherein the user interactions with the wearable computing device include the user selecting a clear water function.

6. The wearable computing device of claim 1, wherein the wearable computing device includes a humidity sensor and wherein the port status data includes humidity data produced by the humidity sensor.

7. The wearable computing device of claim 1, wherein the wearable computing device includes electrodes in the port and the port status data includes data produced by the electrodes indicating whether water is sensed in the port.

8. The wearable computing device of claim 1, wherein the port status data is generated by analyzing audio data produced by the audio sensor to identify audio distortions associated with water in the port.

9. The wearable computing device of claim 1, wherein the digital correction filter is a fixed compensating filter.

10. The wearable computing device of claim 1, wherein the digital correction filter is an adaptive compensating filter.

11. The wearable computing device of claim 1, wherein the digital correction filter is updated over time based on a current evaporation rate for water.

12. The wearable computing device of claim 1, wherein the threshold is predetermined.

13. The wearable computing device of claim 1, wherein the threshold is adaptively determined.

14. The wearable computing device of claim 1, wherein the audio sensor is a microphone.

15. A computer-implemented method for correcting distortion introduced to audio data caused by water in a port associated with an audio sensor, the method comprising:

accessing, by a wearable computing device including one or more processors, port status data, wherein the port status data includes a current evaporation rate for water;

determining, by the wearable computing device and based on the port status data, a water presence likelihood value, the water presence likelihood value representing a likelihood that water is currently in the port; and in accordance with a determination that the water presence likelihood value exceeds a threshold, applying, by the wearable computing device, a digital correction filter to data produced by the audio sensor, wherein the digital correction filter corrects the data produced by the audio sensor to compensate for a presence of water in the port.

16. The computer-implemented method of claim 15, wherein the port status data includes application data supplied by a user.

17. A non-transitory computer-readable medium storing instructions that, when executed by one or more computing devices, cause the one or more computing devices to perform operations, the operations comprising:

generating a water presence signal indicating a presence of water in the port based on port status data, wherein the port status data includes a current evaporation rate for water; and, in response to the water presence signal, applying a digital correction filter to data produced by the audio sensor, wherein the digital correction filter corrects the data produced by the audio sensor to compensate for presence of water in the port.

18. The non-transitory computer-readable medium of claim 17, the operations further comprising:

accessing the port status data for a port associated with an audio sensor;

determining, based on the port status data, a water presence likelihood value, the water presence likelihood value representing a likelihood that water is currently in the port; and in accordance with a determination that the water presence likelihood value exceeds a threshold, generating the water presence signal.

* * * * *